Figure 1:

No. 768,284. PATENTED AUG. 23, 1904.
J. KAHN.
COMBINED STEEL AND CONCRETE BEAM.
APPLICATION FILED JAN. 20, 1904.
NO MODEL. 2 SHEETS—SHEET 1.

Witnesses.
Geo. W. Barnes.
A. F. Wilcox

Inventor.
Julius Kahn.
by Edward N. Pagelsen.
his Attorney.

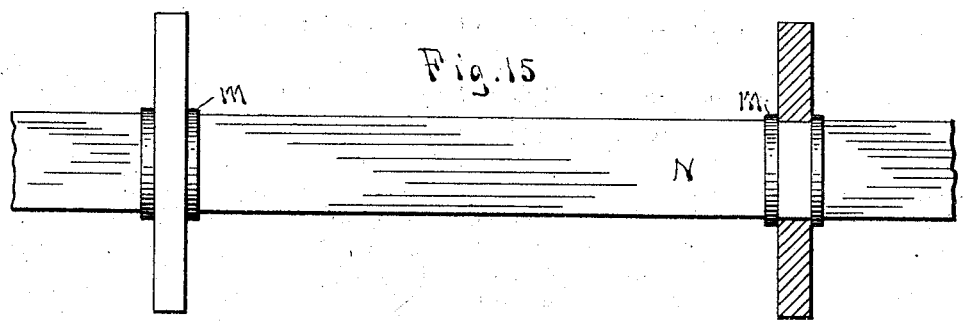
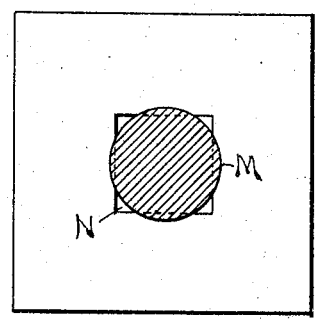
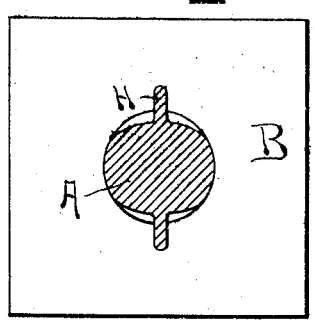
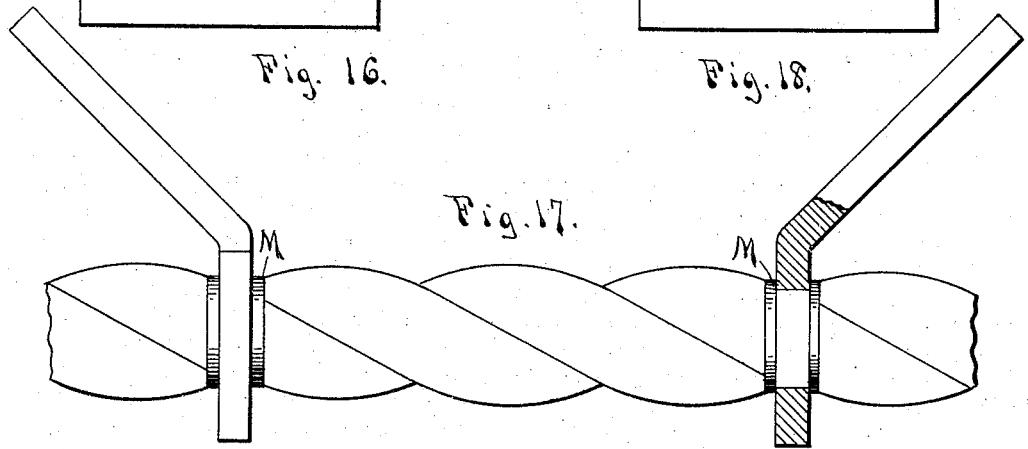
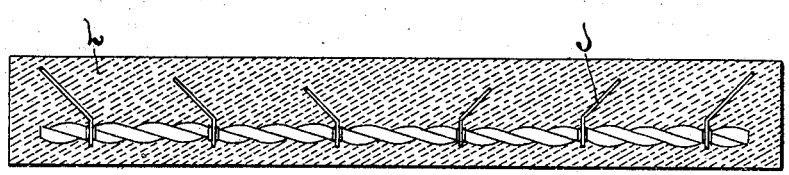

No. 768,284. Patented August 23, 1904.

UNITED STATES PATENT OFFICE.

JULIUS KAHN, OF DETROIT, MICHIGAN.

COMBINED STEEL AND CONCRETE BEAM.

SPECIFICATION forming part of Letters Patent No. 768,284, dated August 23, 1904.

Application filed January 20, 1904. Serial No. 189,798. (No model.)

*To all whom it may concern:*

Be it known that I, JULIUS KAHN, a citizen of the United States, residing at Detroit, in the county of Wayne and State of Michigan, have invented a new and Improved Combined Steel and Concrete Beam, of which the following is a specification.

This invention relates to a combined steel and concrete beam, and has for its object to provide for a longitudinal tension member for said beam supplemented with washers or deformations to insure better contact with the concrete body and to prevent stripping.

A further object of my invention is to construct the main tension-bar of uniform cross-sections in order that there may be no waste of material and to enable the use of a greater or less number of washers, as may be desired.

These objects I attain by the construction and arrangement of the parts, as illustrated in the drawings, and set forth in the description and claims.

Figure 5:
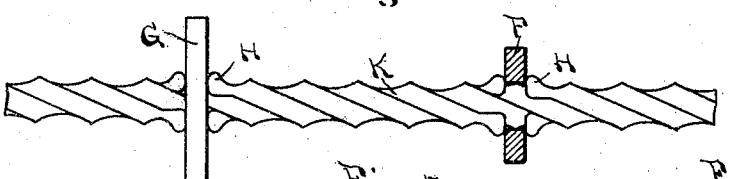
Figure 12:
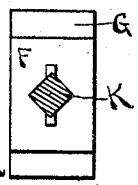
Figure 6:
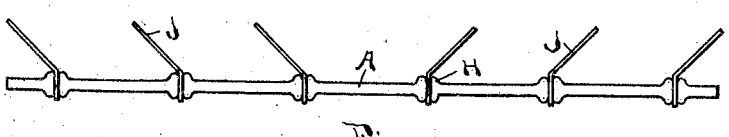
Figure 13:
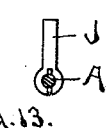
Figure 7:
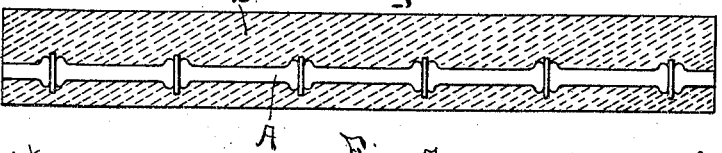
Figure 14:
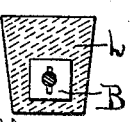

In the accompanying drawings, Figures 1, 2, 3, 4, and 6 are views of a bar constructed in accordance with my invention, having washers of different forms. Fig. 5 shows a tension member in the form of a twisted square bar. Fig. 7 is a longitudinal section of the beam with the tension member in position. Figs. 8 to 13, inclusive, are cross-sections of the tension members shown in Figs. 1 to 6, inclusive, respectively. Fig. 14 is a cross-section of the beam shown in Fig. 7. Fig. 15 shows a square bar molded to give a round cross-section on each side of the washers. Fig. 16 is a cross-section through the alteration. Fig. 17 is a similar bar twisted. Fig. 18 is an enlarged cross-section through the alteration of the bar shown in Fig. 1. Fig. 19 shows a beam with the tension member of Fig. 17 in position.

Similar reference characters refer to like parts throughout the several views.

Figure 8:
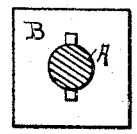
Figure 2:
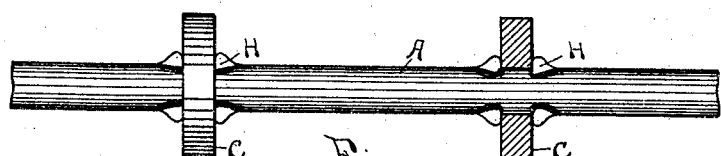
Figure 9:
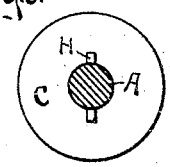
Figure 3:
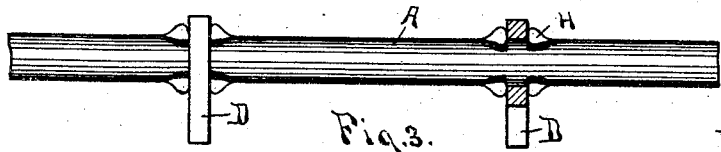
Figure 10:
Figure 4:
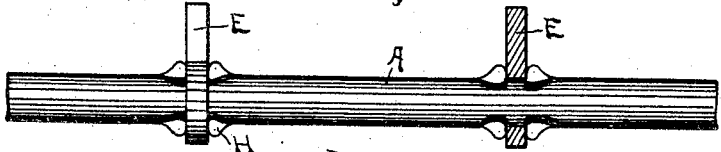
Figure 11:
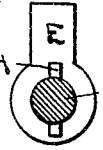

A is the main longitudinal bar, of round steel or similar material capable of resisting tension stresses. This bar is provided at points intermediate its ends with the washers B, which may be used in any desired number and placed at any desired distance apart, either uniformly spaced or preferably closer together at the ends of the bars. These washers B, as shown in Figs. 8 and 18, are square, with a circular opening in the center to fit on the bar A, which will also be circular in cross-section. After the washers have been placed on the bar an upsetting, distortion, or deformation of said bar (indicated by H) is made on either side of the washers for the purpose of holding them securely in position by placing the bar between two pairs of dies, the washer being between the pairs. When the dies are closed, a portion of the bar is squeezed out radially, so as to form a lug or ear H on each side of the washer, thereby rigidly securing the washer in place on the bar without reducing the cross-sectional area. These lugs are preferably formed in pairs, one on either side of the bar. The washers may be of any shape or size, as shown in the various figures, depending upon the shape and load of the beam.

Where square bars are used, either straight or twisted, I prefer to change the cross-section at the point of alteration of the cross-section from square to round, as shown in Figs. 15, 16, and 17, which may be done by using cylindrical dies. The diameter of a circle of unit area is 1.13, so that four strong lugs or shoulders M will be formed on the bar N on either side of the washers. The bar may be twisted either before or after the alteration of the cross-section; but I prefer to twist the bar after the washers are secured in place.

As shown in Fig. 5, the bar K is provided with spiral corrugations, which greatly increase the adhesion of the concrete. The washers in this figure are represented of varying sizes, smaller at the middle of the bar and increasing in size as they approach the ends. For the purpose of serving as binders for the concrete these washers would preferably be made rectangular or oblong and the greater length placed in a vertical line of the beam L. They may extend perpendicularly to the main longitudinal beam or may be inclined obliquely thereto, as represented in Figs. 6 and 17. In this modification the washers best perform the function of binding the concrete against sheering stresses and at the same time prevent the bar from stripping. It is not necessary that these washers shall be of great weight or strength, but are preferably constructed of a comparatively light material.

The adhesion of concrete to a plain bar is considerable, but not sufficient in all cases to make a beam of symmetrical strength—that is, one in which the adhesion of the concrete necessary to prevent stripping will equal the tensile strength of the longitudinal metal bar. By the use of my invention these factors may be provided for as particular cases demand and the highest efficiency obtained by the reinforcement.

To form the beam, the tension-bar is suspended or otherwise supported in and near the bottom of the mold and concrete rammed around it, which when setting unites with the tension member, forming a beam of great strength, the tension member being below the neutral axis of the beam.

Having now explained my improvement, what I claim as my invention, and desire to secure by Letters Patent, is—

1. In a metal reinforcement for concrete, the combination of a tension member, of a plurality of metal blocks or washers placed upon the member at points intermediate its ends, said washers having arms projecting laterally from one side of the member, the cross-section of said member being changed to form shoulders for the support of said blocks.

2. In a beam, the combination of a tension member of uniform cross-section and uniformly twisted, of a plurality of auxiliary pieces placed upon said member at points intermediate its ends and inclined in opposite directions from the center and secured in position by deformations of said member on the opposite sides thereof, and a beam of plastic material surrounding said member.

3. In a beam, the combination of a longitudinally-disposed tension member, of auxiliary pieces placed upon said member at points intermediate its ends and secured in position by deformation of the member without varying its cross-sectional area, and a beam of plastic material surrounding said tension member, the tension member being below the neutral axis of the beam.

4. In a metallic reinforcement for concrete, the combination of a metallic bar longitudinally disposed, of auxiliary perforated members strung upon the bar and secured in place, said auxiliary members being inclined in opposite directions from the middle of said bar.

5. In a metallic reinforcement for concrete, the combination of a bar, rectangular in cross-section, and washers on said bar having rectangular openings, said bar being molded to circular cross-sections to form shoulders to support said washers.

6. In a metallic reinforcement for concrete, the combination of a twisted bar, rectangular in cross-section, and washers on said bar, said bar being molded to circular cross-section to form shoulders to support said washers.

7. In a metallic reinforcement for concrete, the combination of a bar, rectangular in cross-section, and washers on said bar having rectangular openings and being inclined in opposite directions from the middle of said bar, said bar being molded to circular cross-sections to form supporting-shoulders on each side of said washers.

8. In a metal reinforcement for concrete, the combination of a tension member, of a plurality of metal blocks or washers placed upon the member, at points intermediate its ends, and of a deformation of said member without varying its cross-sectional area whereby a shoulder is given for the support of said blocks.

9. In a reinforcement for concrete or similar material, the combination of a longitudinal bar of uniform cross-section, of a plurality of washers placed upon said bar at points intermediate its ends, and secured against longitudinal movement by deformations of the bar to form shoulders on opposite sides of the washers which distortions do not vary the cross-sectional area of the bar.

10. In a metal reinforcement for concrete, the combination of a tension member, of a plurality of auxiliary members placed upon the tension member intermediate its ends, said auxiliary members having arms projecting laterally from one side, the cross-section of said tension member being changed to form shoulders for the support of said auxiliary members.

In testimony whereof I have signed my name to this specification in the presence of two subscribing witnesses.

JULIUS KAHN.

Witnesses:
 EDWARD N. PAGELSEN,
 MAURICE GOLDENBERG.